United States Patent
Ierullo et al.

(10) Patent No.: US 8,750,923 B2
(45) Date of Patent: Jun. 10, 2014

(54) SUPPLEMENTAL INFORMATION FOR MOBILE TERMINATED MOBILE INITIATED CALLING

(75) Inventors: Salvatore Ierullo, Oakville (CA); Bradford Lawrence Spencer, Hammonds Plains (CA); Richard John George, Waterloo (CA)

(73) Assignee: BlackBerry Limited, Waterloo (CA)

( * ) Notice: Subject to any disclaimer, the term of this patent is extended or adjusted under 35 U.S.C. 154(b) by 444 days.

(21) Appl. No.: 12/893,165

(22) Filed: Sep. 29, 2010

(65) Prior Publication Data

US 2012/0077478 A1  Mar. 29, 2012

(51) Int. Cl.
*H04M 1/00* (2006.01)

(52) U.S. Cl.
USPC .................. 455/552.1; 455/414.1; 455/555

(58) Field of Classification Search
USPC ........ 455/412.1, 412.2, 413, 414.1, 415, 417, 455/466, 566, 552.1, 553.1, 555, 554.2; 379/211.02
See application file for complete search history.

(56) References Cited

U.S. PATENT DOCUMENTS

| | | | |
|---|---|---|---|
| 6,408,177 B1 * | 6/2002 | Parikh et al. ............... | 455/414.4 |
| 7,657,251 B2 | 2/2010 | Okabe | |
| 2005/0243982 A1 | 11/2005 | Starbuck | |
| 2006/0160566 A1 * | 7/2006 | Plahte et al. ............... | 455/554.1 |
| 2007/0025530 A1 | 2/2007 | Tidwell et al. | |
| 2007/0248221 A1 * | 10/2007 | Chatterjee et al. ....... | 379/211.02 |
| 2008/0248790 A1 | 10/2008 | Ophir et al. | |
| 2009/0034515 A1 | 2/2009 | Cook et al. | |
| 2009/0147772 A1 | 6/2009 | Rao et al. | |
| 2009/0181648 A1 * | 7/2009 | Bao et al. ................... | 455/414.1 |
| 2009/0203375 A1 * | 8/2009 | Gisby et al. ................ | 455/426.1 |
| 2010/0048180 A1 * | 2/2010 | Sapkota et al. ............. | 455/413 |
| 2010/0272250 A1 * | 10/2010 | Yap et al. ................. | 379/212.01 |

FOREIGN PATENT DOCUMENTS

EP  1032224 A2  8/2000

OTHER PUBLICATIONS

Examination Report mailed May 26, 2011. In corresponding application No. 10182193.2.
Extended European Search Report; EP App. No. 10182193.2, dated Jan. 12, 2011.
Office Action mailed Nov. 4, 2013, in corresponding Canadian patent application number 2,746,060.

* cited by examiner

*Primary Examiner* — Jean Gelin
(74) *Attorney, Agent, or Firm* — Novak Druce Connolly Bove + Quigg LLP

(57) ABSTRACT

Availability of a call for a mobile device can be signaled over a data channel; to avoid unnecessary airtime charges, an audio channel for the voice call is setup only if a user of the mobile device accepting the call. Responsive to the user accepting the call, the mobile device can signal to a network to establish the audio channel. Establishing the audio channel takes some time. The time in which the audio channel is established is used to output, at the mobile device, supplemental information received over the data channel, such as information about a calling party, such as directory information, organization information, and call history. The outputting of such information during this time period makes a user experience better, because the user is less likely to think that a call has failed by observing an unfilled delay between when the call was accepted through the user interface and when the audio channel is actually available to service the call.

15 Claims, 5 Drawing Sheets

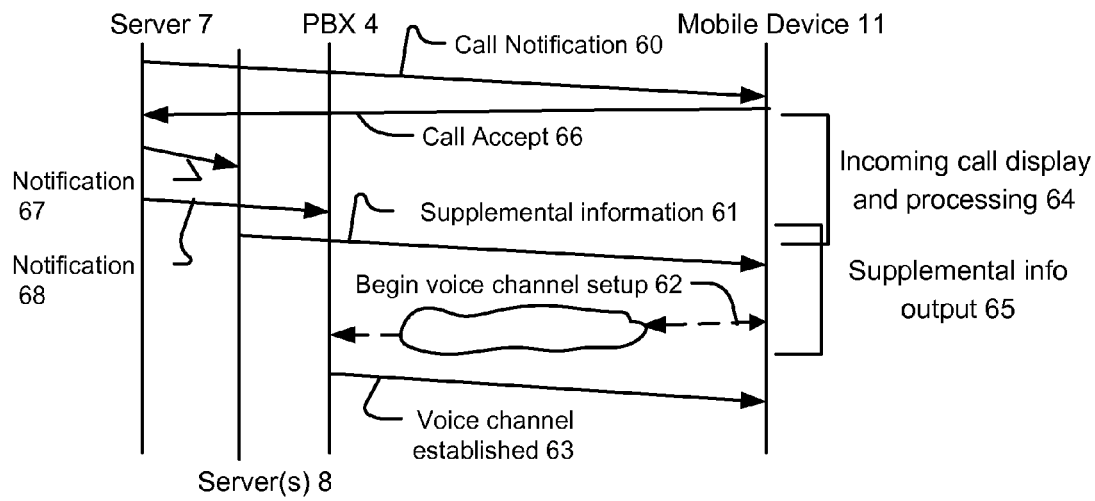
FIG. 4
FIG. 5
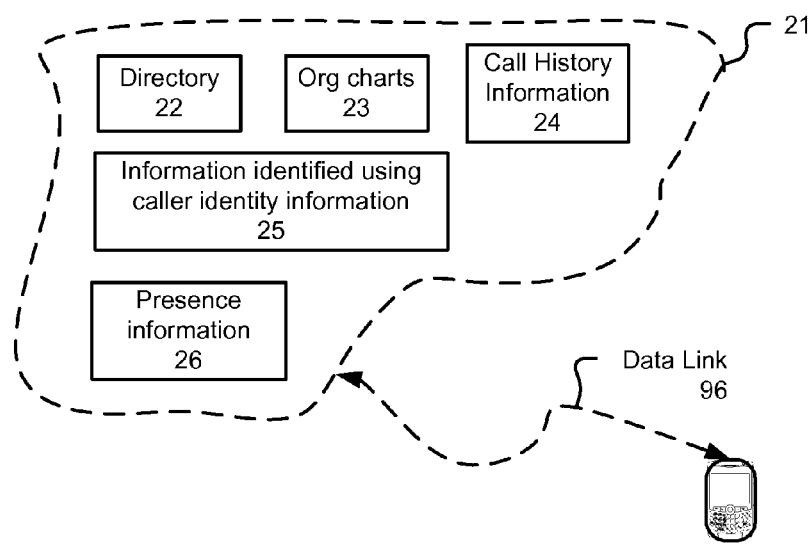

SUPPLEMENTAL INFORMATION FOR MOBILE TERMINATED MOBILE INITIATED CALLING

BACKGROUND

1. Field

The present application relates to mobile device communications, such as voice and data communication, and more particularly to calls involving a PBX.

2. Related Art

Mobile devices are used for voice and data communications. Increasingly, mobile devices can be used in a business environment, and it can be desirable to involve telephony systems typically associated with business environments, such as Private Branch Exchanges (PBXs) in mobile telephony. Further advancements in these areas remain desirable.

BRIEF DESCRIPTION OF THE DRAWINGS

Reference will now be made, by way of example, to the accompanying drawings which show example embodiments of the present application, and in which:

FIG. 4 depicts a signal ladder of example signals that can be exchanged in setting up a voice channel, and a time frame in which supplemental information can be sent, displayed or sent and displayed;

FIG. 5 depicts example sources of supplemental information that can be displayed at a mobile device;

DESCRIPTION

It would be advantageous to provide enterprise telephony services and other enhanced services to mobile devices. In some situations and call scenarios, a mobile device can be notified of a call available at a PBX 4 to be directed to the mobile device. In some networks and with some devices, this notification can be sent on a data channel, such that no audio channel has yet been established. The establishment of the audio channel can be started, for example, from the PBX or from the mobile device. Since mobile devices are often tariffed starting from when an audio channel is established, starting to setup an audio channel from the mobile device, before a user has indicated that it will accept the call can incur charges, even though the user ultimately does not accept the call.

However, a time incurred by waiting for a user to accept the call before establishing a voice channel causes a time delay between when the user indicated acceptance of the call to a time when the audio channel actually is available. Such a time delay can cause the user to believe that the call has failed to setup. Also, in general, the user experience is negatively impacted waiting for the call to be setup. Where a data channel exists to the mobile device, such as between the mobile device and a server, such as a third party call control server, the server can provide information over the data channel to the mobile device, which the mobile device can output, such as aurally, visually or by both audio and visual output means. Such information can be related to the incoming call, such as more information about the identity of a person originating the call. If the call originates from an enterprise number, then enterprise information systems may be accessible to provide that information to the mobile device.

By presenting such information between a time when the call has been accepted through the user interface and when the audio (voice) channel is ready to handle traffic, the user experience is improved.

Figure 1:
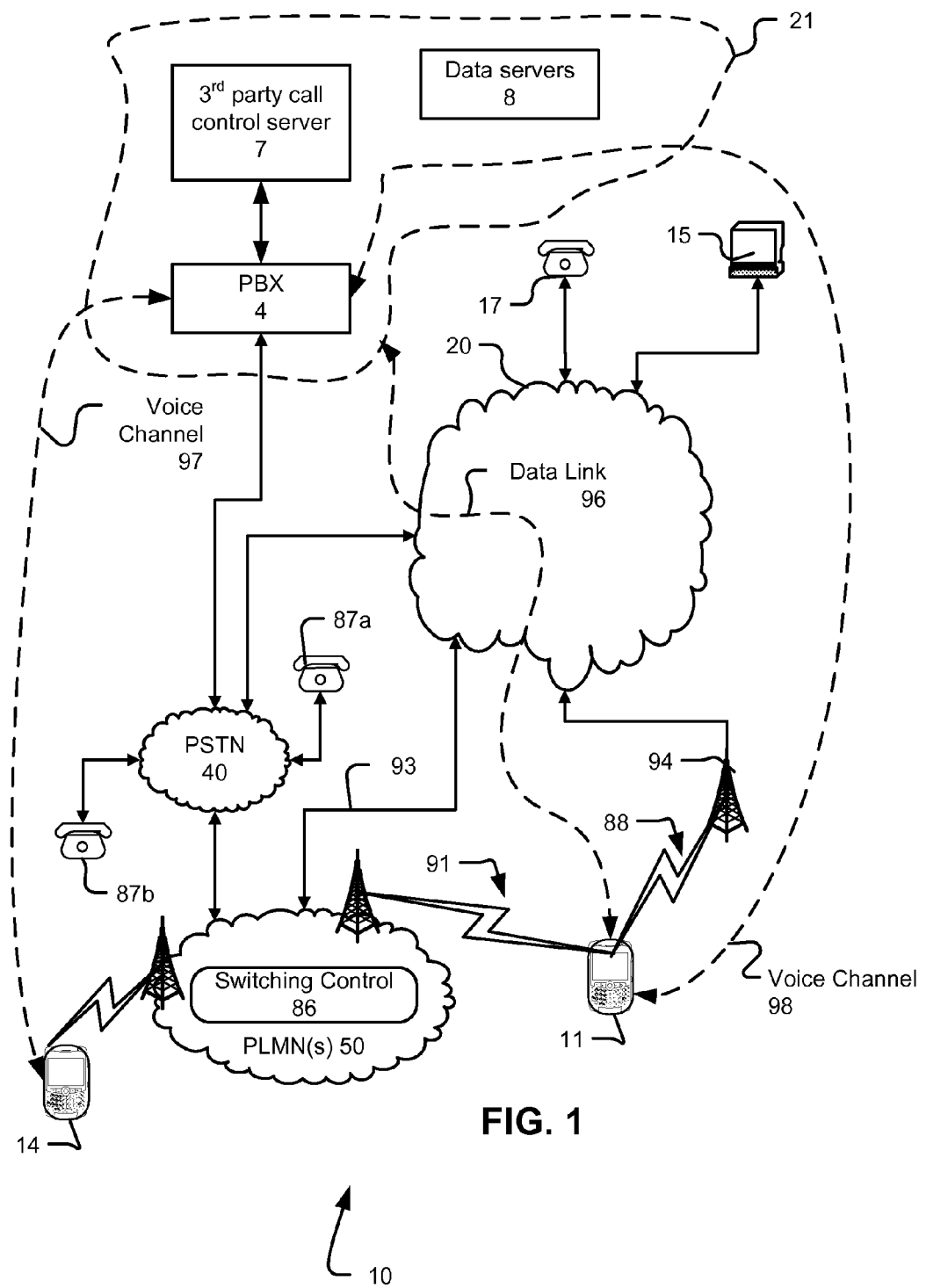
FIG. 1 depicts a diagram of a network involving a PBX, a call control server, and a mobile device, among other elements depicted to provide context.

Reference is now made to FIG. 1, which shows, in block diagram form, an example system arrangement 10, for explaining aspects according to this disclosure in more detail. FIG. 1 depicts that arrangement 10 includes a network 20, which can be comprised of one or more internets and other networks, and can include, for example, a corporate intranet, as well as components of public networks, such as components of the Internet. FIG. 1 depicts that communication devices, such as a telephone 17 and a computer 15 can be coupled to communicate using network 20. PSTN 40 also is depicted as being in communication with network 20. Two PSTN telephones 87a and 87b are depicted as being reachable over the PSTN. A Public Land Mobile Network (PLMN) 50 also is depicted, and includes a switching control 86. PLMN 50 can be coupled to PSTN 40, and to network 20, through a data communication path 93. Data communication path 93 can include one or more packet networks, or linkages between packet networks. Separate identification of network 20 and path 93 is at least partially a matter of convenience, in that path 93 also, in many circumstances, can be considered part of network 20.

PSTN 40 operates over circuit-switched lines. Communication path 93, and network 20 can include a wide variety of digital communication technologies, including packet switching technologies and protocols. For example, Internet Protocol (IP) addressing, and Session Initiation Protocol (SIP) can be used for establishing and conducting voice communications carried over path 93 and network 20.

A mobile device 11 is depicted as communicating with PLMN 50 using cellular communication 91. Cellular communication 91 can itself be implemented using a wide variety of technologies, and can also include voice and data network components (e.g., a voice channel and a data channel time, frequency, or code division multiplexed, according to any of a variety of implemented or proposed cellular communication approaches). Mobile device 11 also can communicate using wireless Local Area Network (LAN) technologies 88, such as those according to the IEEE 802.11 series of standards and proposals. Communication using such WLAN technologies 88 can occur between mobile device 11 and a base station 94, which in turn is coupled with network 20.

FIG. 1 also depicts that a voice channel 98 can be established between mobile device 11 and a Private Branch Exchange (PBX) 4, and a voice channel 97 between another device (e.g., a mobile device 14) and PBX 4. In one example, mobile device 14 is attempting to call mobile device 11, and the PBX 4 may establish voice channel 98 in order to complete the call. In other examples, mobile device 11 can request that PBX 4 establish a voice channel to it, and to another entity, such as mobile device 14, or landline phones 87a or 87b.

A data channel 96 can be provided between third party call control server 7 and mobile device 11. Information can be signaled across data channel 96 for exchanging setup and progress information for voice calls that can be carried over a variety of media, such as portions of the PSTN 40, PLMN 50, and portions of network 20. For example, mobile device 11 can signal to third party call control server 7 to call mobile device 11, to establish a voice channel.

Figure 2:
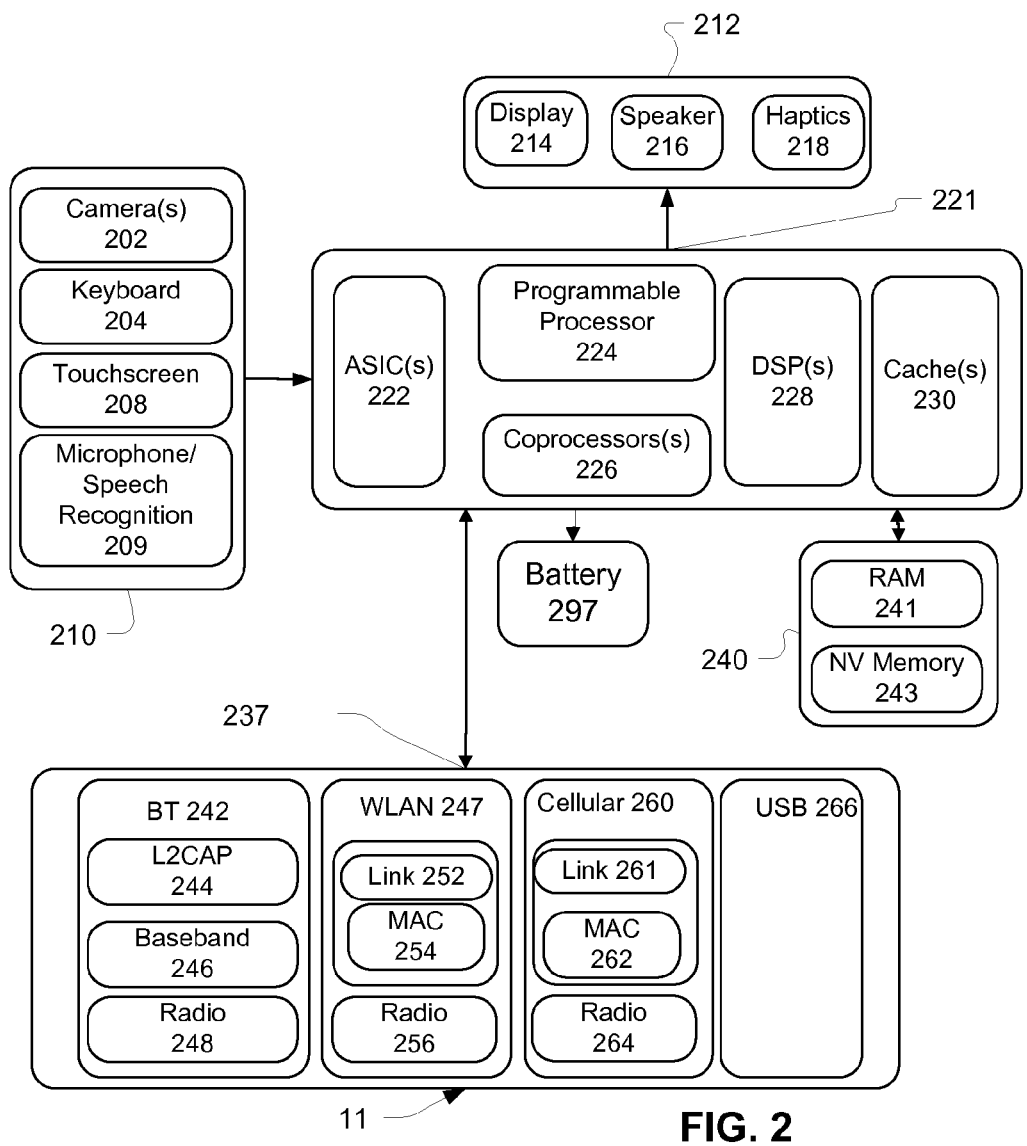
FIG. 2 depicts example of components of an example mobile device.

FIG. 2 depicts example components that can be used in implementing mobile device 11 according to the above description. FIG. 2 depicts that a processing module 221 may be composed of a plurality of different processing elements, including one or more ASICs 222, a programmable processor 224, one or more co-processors 226, which each can be fixed function, reconfigurable or programmable, and one or more digital signal processors 228. For example, ASIC or co-processor 222 may be provided for implementing graphics functionality, encryption and decryption, audio filtering, and other such functions that often involve many repetitive, math-intensive steps. Processing module 221 can comprise memory to be used during processing, such as one or more cache memories 230.

Processing module 221 communicates with mass storage 240, which can be composed of a Random Access Memory 241 and of non-volatile memory 243. Non-volatile memory 243 can be implemented with one or more of Flash memory, PROM, EPROM, and so on. Non-volatile memory 243 can be implemented as flash memory, ferromagnetic, phase-change memory, and other non-volatile memory technologies. Non-volatile memory 243 also can store programs, device state, various user information, one or more operating systems, device configuration data, and other data that may need to be accessed persistently. A battery 297 can power device 11 occasionally, or in some cases, it can be a sole source of power. Battery 297 may be rechargeable.

User input interface 210 can comprise a plurality of different sources of user input, such as a camera 202, a keyboard 204, a touchscreen 208, and a microphone, which can provide input to speech recognition functionality 209. Output mechanisms 212 can include a display 214, a speaker 216 and haptics 218, for example. These output mechanisms 212 can be used to provide a variety of outputs that can be sensed by a human, in response to information provided from processing module 221.

Processing module 221 also can use a variety of network communication protocols, grouped for description purposes here into a communication module 237, which can include a Bluetooth communication stack 242, which comprises a L2CAP layer 244, a baseband 246 and a radio 248. Communications module 237 also can comprise a Wireless Local Area Network (247) interface, which comprises a link layer 252 with a MAC 254, and a radio 256. Communications module 237 also can comprise a cellular broadband data network interface 260, which in turn comprises a link layer 261, with a MAC 262. Cellular interface 260 also can comprise a radio 264 for an appropriate frequency spectrum. Communications module 237 also can comprise a USB interface 266, to provide wired data communication capability. Other wireless and wired communication technologies also can be provided, and this description is exemplary.

Figure 3:
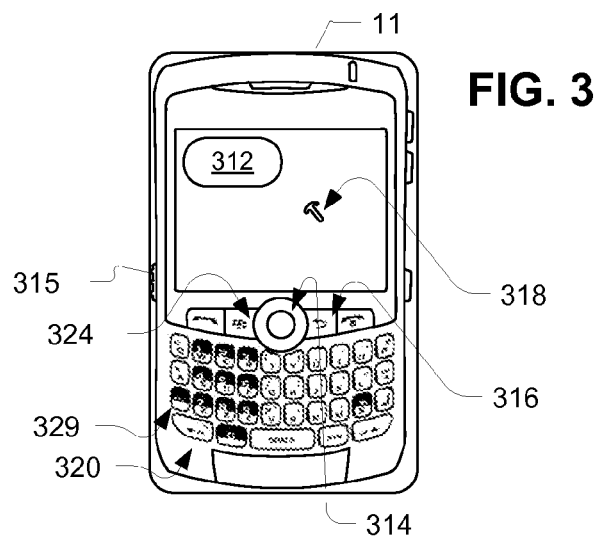
FIG. 3 depicts an example view of an example mobile device, and some of the user interface componentry thereof.

Referring to FIG. 3, there is depicted an example of mobile device 11. Mobile device 11 comprises a display 312 and a cursor or view positioning device, here depicted as a trackball 314, which may serve as another input member and is both rotational to provide selection inputs and can also be pressed in a direction generally toward housing to provide another selection input. Trackball 314 permits multi-directional positioning of a selection cursor 318, such that the selection cursor 318 can be moved in an upward direction, in a downward direction and, if desired and/or permitted, in any diagonal direction. The trackball 314 is, in this example, situated on a front face (not separately numbered) of a housing 320, to enable a user to maneuver the trackball 314 while holding mobile device 11 in one hand. In other embodiments, a trackpad or other navigational control device can be implemented as well.

The mobile device 11 in FIG. 3 also comprises a programmable convenience button 315 to activate a selected application such as, for example, a calendar or calculator. Further, mobile device 11 can include an escape or cancel button 316, a menu or option button 324 and a keyboard 329. Menu or option button 324 loads a menu or list of options on display 312 when pressed. In this example, the escape or cancel button 316, menu option button 324, and keyboard 329 are disposed on the front face of the mobile device housing, while the convenience button 315 is disposed at the side of the housing. This button placement enables a user to operate these buttons while holding mobile device 11 in one hand. The keyboard 329 is, in this example, a standard QWERTY keyboard.

FIG. 4 depicts a single ladder in which server 7 sends a call notification 62 to mobile device 11. Call notification 60 can be sent over a data channel, such as data link 96 depicted in FIG. 1. Mobile device 11, upon receiving call notification 60, can display a message of the availability of the incoming call, such as on or through a user interface of device 11, and undertake ancillary processing 64, for example.

If a user (or more generally, device 11) accepts the call, a notification 66 of such call acceptance can be transmitted over the data channel for reception by server 7. Responsive to such notification 66, a notification of call acceptance can be sent from server 7 to server 8, which can responsively obtain one or more elements of supplemental information and send such supplemental information to mobile device 11. One or more servers 8 can serve supplemental information 61 to mobile device 11, which will be displayed by mobile device 11 during a time while voice channel set up 62 is proceeding. Examples of supplemental information that can be transmitted and displayed are described with respect to figures that follow below. Responsive to receiving an indication through the interface that the call is accepted, mobile device 11 can begin set up of a voice channel 62. In another example, server 7 can signal PBX 4 via a notification 68, to begin setup of voice channel 62 to mobile device 62

The voice channel can carry audio between mobile device 11 and PBX 4.

Ultimately, PBX 4 can acknowledge that the voice channel has been established 63, which indicates that the voice channel is ready to carry audio information for the call, and thus the call can proceed. As such, availability and presentation of supplemental information 61, during a time when mobile device is waiting for the voice channel to be established, allows a better user experience. One way in which the user experience is better is that the user is less likely to be confused about call status, because the presentation of such supplemental information tends to indicate that call setup progress is ongoing. By contrast, in typical circumstances, a user typically expects to be able to talk immediately upon accepting an incoming call. However, such expectation would not be met in these situations, because the mobile phone does not indicate that the voice channel should be established until the call is accepted, and establishing such voice channel takes some time.

FIG. 5 depicts examples of information that can be served by servers 8, which are depicted in FIG. 4. Examples of information that can be served from one or more servers include directory information 22, which can be served from a directory server. Other organizational information also can be available within an enterprise from one or more servers, such as organizational charts or other information about a structure of an enterprise 23. Information 26 relating to presence information on other communication or messaging systems also can be accessed and served. By further example, other information 25 can be identified using identity information of a caller who initiated the call to PBX 4, which is the subject of call notification 60. For example, a search can be done on one or more databases to identify information relevant to the caller. Still further examples of information that can be accessed include call history information, such as call history information from the caller. Collectively these sources of information can include one or more servers identified as servers 8 (FIG. 1). However, a variety of physical implementations in storage for such data can be provided. For example, storage can be implemented in network attached storage, which is accessed by one or more processing nodes according to criteria specified. Such information can be served over data link 96, and which is referred to as supplemental information 61 in FIG. 4.

Figure 6:
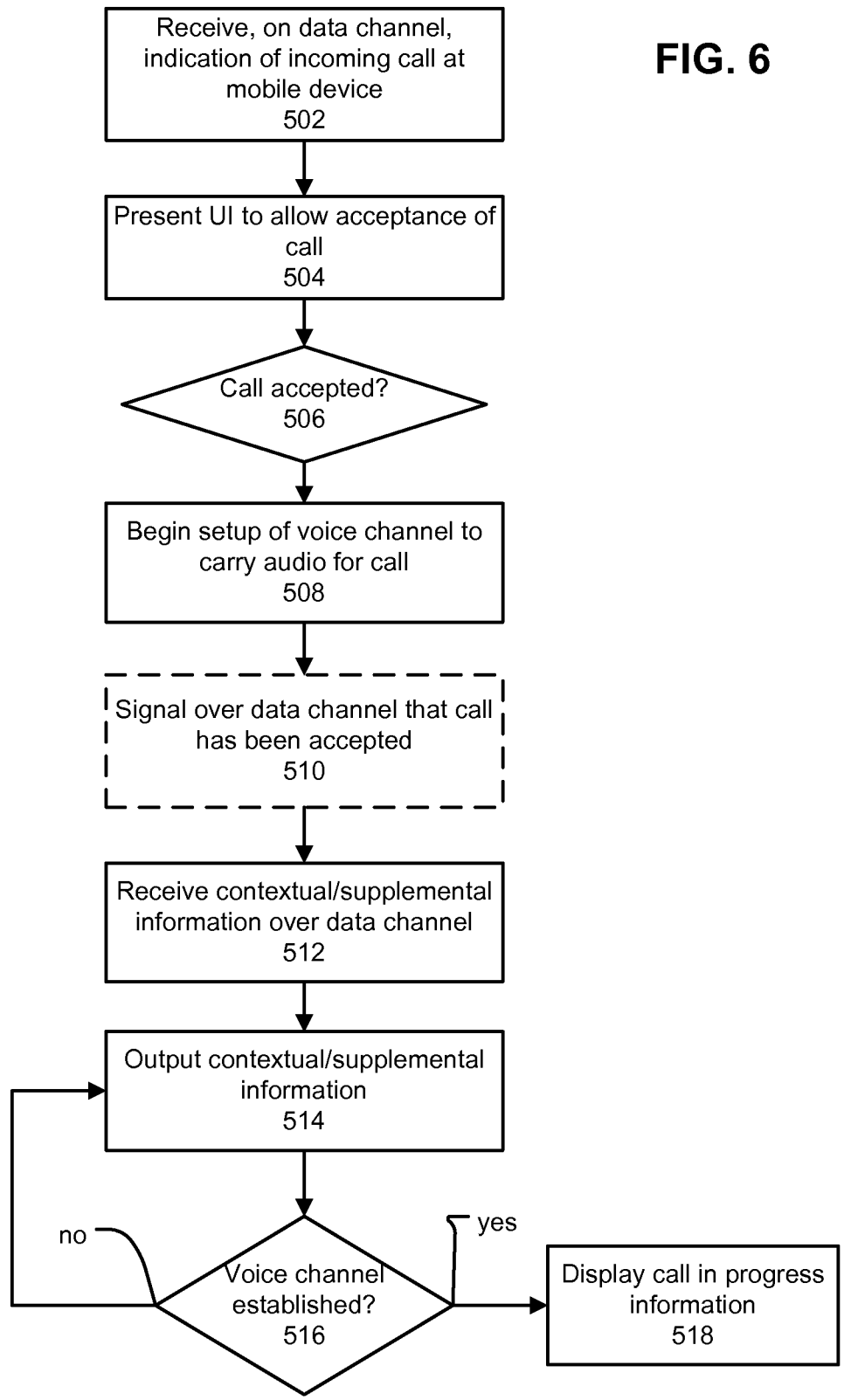
FIG. 6 depicts an example method that can be performed at a mobile device according to this disclosure.

FIG. 6 depicts a first example method according to aspects described herein. Mobile device 11 can receive (502) an indication of an incoming call on data channel, such as a data channel 96. Device 11 presents (504) a user interface that allows the call to be accepted, and optionally ignored. The user interface forwards input that was received to a function that determines (506) whether the input is indicative of call acceptance. If the input is indicative of call acceptance, mobile device 11 begins (508) set up of a voice channel (indicates to PLMN 50 or other network resources that the voice channel should be setup) to carry audio for the now accepted call. Mobile device 11 also can signal (510) that the call has been accepted over the data channel, even while the voice channel is being set up starting from mobile device 11 and ultimately to be terminated at PBX 4.

Mobile device 11 receives (512) contextual or supplemental information over data channel 96, as described with respect to FIG. 4. Mobile device 11 outputs (514) that received contextual or supplemental information, while the voice channel is being set up. Ultimately a determination can be made that the data channel is established, and responsively, call progress information can be displayed (518). However, if the voice channel is not yet established then further supplemental or contextual information can be displayed or outputted (514) or the same information can be repeatedly displayed.

Figure 7:
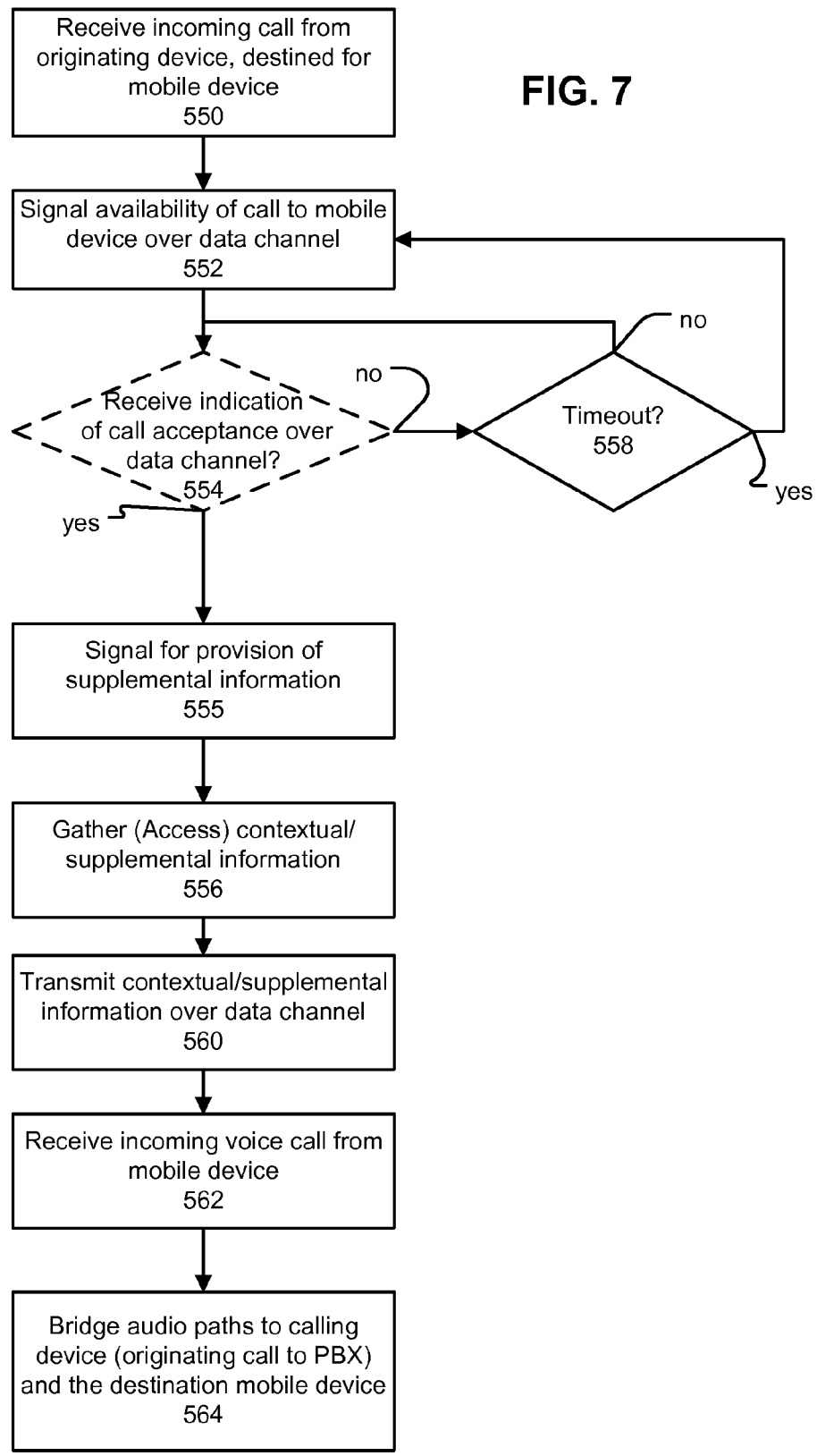
FIG. 7 depicts an example method that can be performed at a server communicating with a mobile device, according to this disclosure.

FIG. 7 depicts an example method that can be implemented by a server according to aspects described herein. PBX 4 can receive (550) an incoming call from an originating device, which is destined for mobile device 11. Third-party call control server 7 can signal (552) availability of the call to mobile device 11 over data channel 96. Third-party call control server 7 can receive (554) an indication of call acceptance over data channel 96. Responsive to receiving such an indication, third-party call control server 7 can cause other information such as contextual or supplemental information to be gathered or accessed (556), such as by sending (555) a signal to server 8 to gather and/or provide that information to device 11. That contextual or supplemental information can be transmitted (560) over data channel 96 to mobile device 11. Subsequently, an incoming voice call is received from mobile device (562) and the audio path for that incoming voice call can be bridged (564) to an audio path back to the device that originated the call identified in (550), which completes an audio path for the voice call.

Mobile devices are increasingly used for communication, such as voice calling and data exchange. Also, mobile devices increasingly can use a wider variety of networks for such communication. For example, a mobile device can have a broadband cellular radio and a local area wireless network radio. Additionally, the broadband cellular capability of a mobile device may itself support a variety of standards, or protocols that have different communication capabilities, such as GSM, GPRS, EDGE and LTE.

Further, some aspects may be disclosed with respect to only certain examples. However, such disclosures are not to be implied as requiring that such aspects be used only in embodiments according to such examples.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

What is claimed is:

1. A method, comprising:
receiving, at a mobile device, an indication of availability of a voice call;
outputting an indication of the availability of the voice call through an interface of the mobile device;
receiving input through the interface that the voice call is to be accepted;
receiving supplemental information pertaining to the voice call over a data channel in response to the acceptance of the voice call;
beginning to establish the voice channel; and
during establishing of the voice channel, outputting elements of the supplemental information through the interface.

2. The method of claim 1, wherein the receiving of the supplemental information comprises receiving one or more of contact information available from an enterprise directory server, and organization information pertaining to an identity of a caller.

3. The method of claim 1, wherein beginning to establish the voice channel comprises signaling to network infrastructure equipment one or more commands.

4. The method of claim 1, wherein beginning to establish the voice channel comprises signaling to network infrastructure equipment of a public land mobile network.

5. A method, comprising:
indicating, from an enterprise network, over a data channel to a mobile device that a voice call is available for the mobile device;
receiving an indication on the data channel that the call is accepted at the mobile device;
obtaining supplemental information pertaining to a calling party in response to the acceptance of the call; and
sending the supplemental information to the mobile device over the data channel for display during setup of a voice channel between a Private Branch eXchange (PBX) and the mobile device.

6. The method of claim 5, wherein the obtaining supplemental information comprises obtaining presence information from an enterprise telephony network with which the PBX is coupled.

7. The method of claim 5, wherein the obtaining supplemental information comprises obtaining presence information from enterprise communication platforms comprising one or more of e-mail, and instant messaging servers.

8. The method of claim 5, wherein the obtaining supplemental information comprises obtaining directory information from an enterprise directory server.

9. The method of claim 5, wherein the obtaining supplemental information comprises obtaining organization information about a caller associated with the voice call available for the mobile device.

10. The method of claim 5, wherein the obtaining supplemental information comprises obtaining caller history information pertaining to calls made by a caller associated with the voice call available for the mobile device.

11. The method of claim 5, wherein the obtaining supplemental information comprises obtaining information about an identity of a caller, and searching one or more databases for information pertaining to the caller.

12. A system, comprising
   a voice server, operable to receive incoming voice calls and to bridge two or more incoming voice calls to establish a voice channel between those bridged voice calls;
   a call control server, coupled with the voice server, and operable to communicate with a mobile device over a data channel to indicate to the mobile device the availability of a voice call for the mobile device at the voice server; and
   a supplemental information server, operable to communicate with the mobile device over the data channel to provide, to the mobile device, and to respond to an indication of acceptance of the voice call at the mobile device by sending supplemental information pertaining to the available voice call on the data channel.

13. A mobile device, comprising:
   one or more wireless network interfaces capable of packet data and voice communication;
   a memory;
   a user interface; and
   a processing resource coupled with the memory, with the one or more wireless network interfaces, and with the user interface, and
   programmed to receive an indication, in packet data, of availability of a voice call for the mobile device at a Private Branch eXchange (PBX), to output an indication of voice call availability through the interface, to receive an indication of acceptance of the voice call through the interface, to display supplemental information in response to receiving the indication of acceptance of the voice call, received in packet data over the one or more wireless network interfaces, during a time when the voice channel is being setup to carry audio for the accepted voice call.

14. The mobile device of claim 13, wherein the supplemental information comprises one or more of contact information available from an enterprise directory server, and organization information pertaining to an identity of a caller.

15. The mobile device of claim 13, wherein the processing resource further is programmed to initiate establishment of the voice channel by signaling to network infrastructure equipment one or more commands.

\* \* \* \* \*